United States Patent Office 2,869,411
Patented Jan. 20, 1959

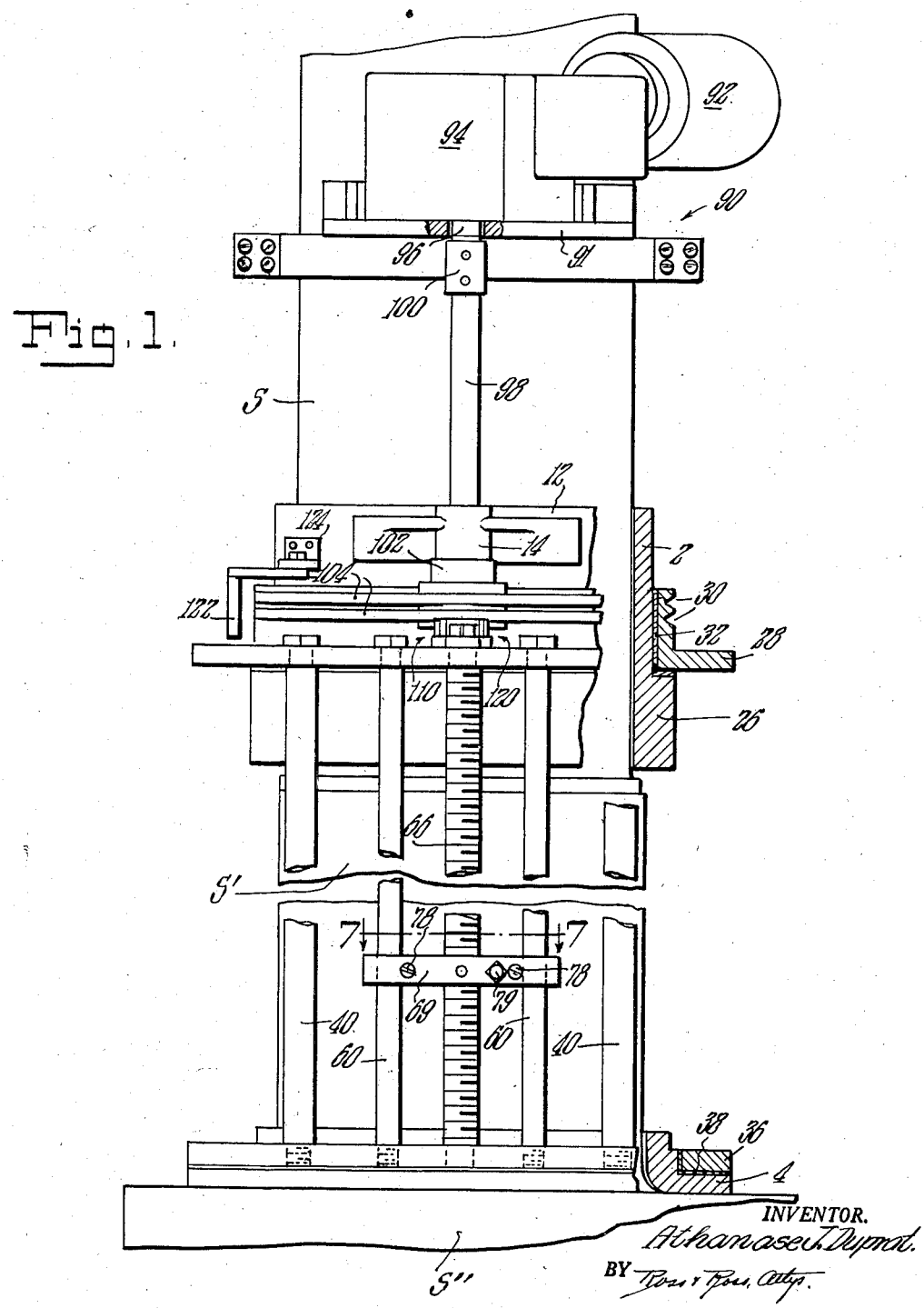

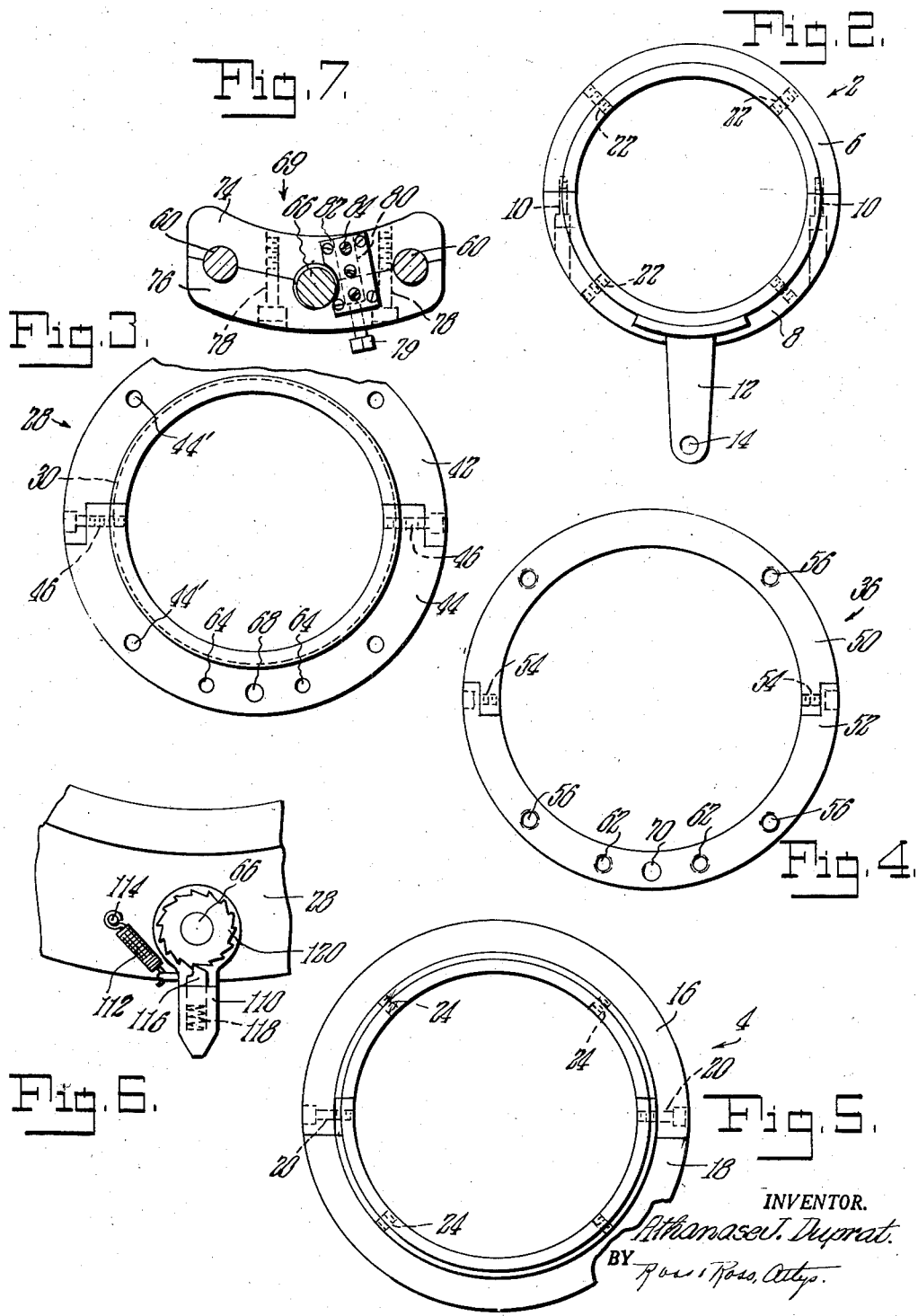

2,869,411

TURNING APPARATUS

Athanase J. Duprat, Chicopee, Mass., assignor to B. F. Perkins & Son, Inc., Chicopee, Mass., a corporation Application October 19, 1956, Serial No. 617,123

2 Claims. (Cl. 82—4)

This invention relates to improvements in machine tool and is directed more particularly to improvements in turning apparatus.

The principal object of the invention is the provision of apparatus for machining the circumference of an object, as by turning, grinding, polishing and the like.

According to novel features of the invention the apparatus is adapted for operating on a stationary object, disposed on a vertical or on a horizontal axis.

The novel apparatus is adapted for many and various uses but, for purposes of disclosure, will be described in connection with turning a journal portion of the shaft of a water-turbine generator unit.

Such a unit has a shaft, of considerable diameter, which is commonly rotatable on a vertical axis.

Journal portions of such shafts, become scored and worn so as to become unserviceable and require reconditioning, or resurfacing.

The lower journal portions of said shafts, although rotatable in bearings, are usually at or below water level, so as to be subject to the effects of grit and other foreign substances, and operating at high speed, require reconditioning every few years, or so.

Such turbine units are of course set on foundations, are extremely heavy, often weighing a hundred or more tons. To make the shaft available for reconditioning, as by turning, it is necessary to disassemble the machine in order to remove the shaft. The cost of assembling and reassembling the machine, following reconditioning of the shaft is not only extremely costly, to the extent of many thousands of dollars, but the machine is likely to be out of service for a matter of months, which is obviously very objectionable from an operating standpoint.

According to the novel features of the apparatus of this invention the shaft journal is reconditioned with the shaft in place. This obviates the expensive disassembly of the machine, removal of the shaft, and reassembly of the components as well as reduces the down time of the machine to a matter of hours.

According to the novel features of this invention, in a broad way, the bearing components for the stationary shaft journal are removed and guide rings are secured to opposite ends of the shaft journal. A hollow structure is rotated relative to the guide rings and about the journal. A tool is carried by a holder that is reciprocated relative to the structure as it rotates. In this way the tool is caused to circumferentially and axially traverse the journal for the turning or reconditioning thereof.

Thus the journal is turned with the shaft remaining stationary in its original position.

The apparatus is constructed and arranged for accurate and uniform turning so that the surface of the journal is concentric relative to its axis of rotation. It has been found that a journal in the neighborhood of twenty-six inches in diameter, and out of round some fifteen-thousandths of an inch has been turned to a predetermined uniform diameter, within a tolerance not exceeding one-thousandth of an inch.

The apparatus of the invention is adapted for various uses, but for purposes of disclosure, the invention will be described in connection with the journal of a turbine shaft. The invention however is not to be limited thereto as the apparatus may be changed and modified without departing from the spirit and scope of the invention.

In the drawings:

Fig. 1 is a side elevational view of apparatus embodying the novel features of the invention;

Fig. 2 is a plan view of the upper guide ring of the apparatus, shown in Fig. 1;

Fig. 3 is a plan view of the upper annulus of the carriage or cage of the apparatus, shown in Fig. 1;

Fig. 4 is a plan view of the lower annulus of the carriage or cage of the apparatus;

Fig. 5 is a plan view of the lower guide ring of the apparatus;

Fig. 6 is a plan view of the mechanism for turning the feed screw of the tool carrier; and Fig. 7 is a sectional view on the line 7—7 of Fig. 1.

Referring now to the drawings more in detail the invention will be fully described.

It will be understood that while the apparatus will be described in connection with the journal of a turbine shaft disposed on a vertical axis, that the apparatus may be used for turning other objects, on vertical or horizontal axes as may be desired.

A stationary shaft on a vertical axis is represented by S which has a lower elongated journal portion S' that is to be turned by the apparatus of the invention, and now to be described.

An upper guide ring 2 is provided which is clamped to a portion of the shaft S above the journal portion S'. A lower guide ring 4 is clamped to the lower portion of the shaft. Said rings 2 and 4 guide upper and lower ends of a carriage or cage for rotation about the journal portion S'. A lowermost portion of the shaft is referenced as S''.

As shown in Fig. 2 the upper guide ring 2 is split, or in two sections 6 and 8. These sections are secured together about the shaft by clamp screws, of suitable form, indicated by 10, so that the ring is fixed against movement on the shaft.

A bracket 12 is fixed to this section 8, extends radially outwardly therefrom and has a bearing 14 for a drive shaft. The bracket may be secured in place by welding or any other suitable means.

Guide ring 4, as shown in Fig. 5, is also split and consists of two sections 16 and 18. The parts 16 and 18 are secured together about the shaft, so as to be fixed thereto, by suitable screws 20 as with the upper ring parts 6 and 8.

The upper ring parts 6 and 8 and the lower ring parts 16 and 18, are provided with circumferentially spaced radially disposed tapped openings 22 and 24 for adjusting screws. Such screws abut the sides of the shaft for aligning the rings concentrically relative to the axis of the shaft. The upper ring 2 is provided with a lower, outwardly extending flange or annular support portion 26, see Fig. 1.

An upper annular cage member 28 is rotatable on the upper ring 2. Said annulus is provided with grooves 30 for belts, as will be described. Bearing material, indicated by 32, is provided for free rotation of the annulus 28 on the ring 2.

A lower annulus 36 is rotatable on the lower ring 4, there being bearing material, indicated by 38 between the members 4 and 36 functions for free rotation of the latter on the former.

Rods 40 have lower ends secured in the lower annulus 36 and upper ends thereof are secured in the upper annulus 28. The rods 40 secured as they are to the annulus members 28 and 36 form therewith a rigid carriage or cage which is guided at upper and lower ends by the rings 2 and 4 for rotation on the axis of the journal S'.

The annulus 28 is of two sections, 42 and 44, as shown in Fig. 3, for assembly on the upper ring 2, and these sections are secured together by bolts or screws indicated by 46, see Fig. 3. Openings for upper ends of the rods 40, are shown at 44'.

The lower annulus 36, shown in Fig. 4 is also in two sections 50 and 52 which are secured together by bolts or screws 54. Said sections are provided with tapped openings 56 for lower ends of the rods 40.

There may be as many longitudinal rods 40, as may be desired, for connecting the annulus members 28 and 36.

Elongated guide rods 60 have lower ends secured in openings 62 of the lower annulus 36 and upper ends secured in openings 64 of the upper annulus 28.

A feed screw 66 has opposite ends rotatable in bearings 68 and 70 of the upper and lower annulus members 28 and 36.

A tool holder or carrier 69 is slidable up and down on the guide rods 60 and is in threaded engagement with the feed screw 66. As the screw is rotated in one direction or the other the holder 69 is moved up or down and along the journal S' to be turned.

The tool holder 69, best shown in Fig. 7, is formed by two sections 74 and 76, which are secured together by screws 78. A socket 80 is provided in the holder for the shank of a tool. A plate 82 is secured over the socket, as shown, and carries screws such as 84, for applying pressure to the shank of a tool in the socket 80. An adjusting screw 79 in threaded engagement with the holder part 76, is provided for adjusting the shank of a tool in the socket 80.

Tools of various forms for various cutting operations may be employed depending upon the machining operation desired, and may vary within wide limits.

An upper support 90 is secured to an upper portion of the shaft S. Such will be split and firmly secured to the shaft in a manner described in connection with the guide rings. Said support carries a forwardly extending shelf or ledge 91.

A motor 92 and associated gear reduction 94, of well known form is fixed to the shelf 91, and a drive shaft 96 depends therefrom. A shaft 98 is connected to the drive shaft 96, by a suitable coupling 100. The lower end of said shaft 98 is rotatable in the bearing 14 of the upper guide ring 2.

A grooved pulley 102 of well known form is fixed to the lower end of the shaft 98. Belts 104 operatively connect the pulley 102 with the grooves 30 of the upper annulus 28 of the cage.

As the motor 92 is energized the shaft 98 is rotated and through the belt connections the cage is rotated. The cage, of course, may be rotated in either direction and the tool for acting on the journal portion S' of the shaft may be arranged according to the direction of rotation and take any desired form for performing the desired machine operation on the journal.

The feed screw 66 is rotated in a step-by-step manner during rotation of the cage, by a lever 110 which is swingable against the action of a return spring 112 secured thereto and to a retainer 114 of the upper annulus 28. A pawl 116 slidable in the lever is urged outwardly by a spring 118 to engage the teeth of a ratchet wheel 120 fixed to the feed screw.

As the cage rotates the lever 110 is engaged by an actuator 122, adjustable on a bracket 124 secured to a stationary part such as 2. Any form of actuator desired may be employed to swing the lever 110 through the desired angle and in cooperation with the feed screw result in the desired movement of the tool holder.

The cage may be rotated in either direction, and the lever 110 and ratchet for the feed screw may be arranged for rotating the feed screw according to the rotation of the cage.

Thus as the cage is in rotation the lever 110 is engaged by the actuator, so that during rotation of the cage the tool holder is moved axially of the journal whereby the tool thereof, moves along and around the journal. In this way the tool traverses the journal circumferentially and axially simultaneously to make the desired cut.

It will be observed that the guide rings are split, as are the annular members of the cage, so that the apparatus may be associated with a shaft in its place in a turbine unit. The disassembly of the unit, removal of the shaft for reconditioning, and reassembly of the unit is obviated, thereby eliminating excessive costs and down time of the unit.

The apparatus of the invention is such that it is possible to machine a journal with efficiency and precision in a relatively short time.

While the novel features of the invention have been described in connection with a certain journal, it will be appreciated that various changes and modifications may be made in the form of the apparatus without departing from the spirit and scope thereof. Therefore it is desired to be limited, if at all, by the appended claims, rather than by the foregoing description.

I claim:

1. Turning apparatus for releasably securing to an elongated vertically disposed stationary shaft above a lower portion thereof and for turning an elongated journal of said shaft above said lower portion comprising in combination, lower and upper sectionalized annular guide rings for releasably securing to an elongated vertically extending stationary shaft below and above an elongated journal of said shaft disposed above a lower portion thereof, a cage including lower and upper sectionalized annulus members rotatable on said lower and upper guide rings and a group of elongated rods circumferentially spaced about said annulus members having lower and upper ends secured therein, an elongated vertically disposed feed screw between a pair of said rods having lower and upper ends rotatable in said annulus members, a holder for a journal turning tool reciprocable up and down on said pair of rods and being in threaded engagement with said feed screw, rotating means for releasably securing to a vertically disposed shaft above said upper guide ring, driving connections between said rotating means and said upper annulus member, and engageable means carried by the upper end of said feed screw and said upper annulus member arranged for intermittent engagement in rotation of said upper annulus member for intermittent rotation of said feed screw to rotate said tool holder.

2. Turning apparatus set forth in claim 1 wherein said rotating means includes a sectionalized support for securing to said shaft having a motor driven mechanism secured thereto provided with a drive shaft, and said driving connections includes an elongated shaft connected to said drive shaft journalled in said upper guide ring and belt and pulley means connecting said elongated shaft and upper annulus member.

References Cited in the file of this patent

UNITED STATES PATENTS

| 554,034 | Saxton | Feb. 4, 1896 |
| 857,242 | Johnson | June 18, 1907 |
| 2,519,087 | Tydeman | Aug. 15, 1950 |
| 2,796,792 | Diaz | June 25, 1957 |